INVENTORS
TOMOYASU TOKUYAMA
MASAAKI KOBORI
MICHIO HORIUCHI

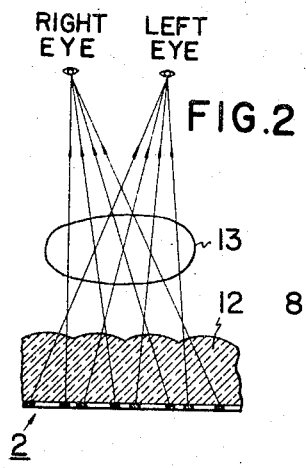
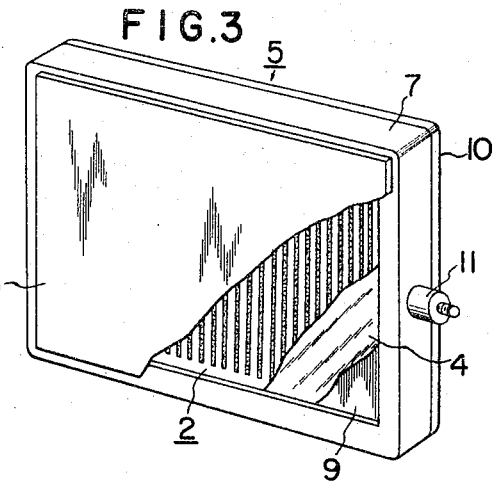
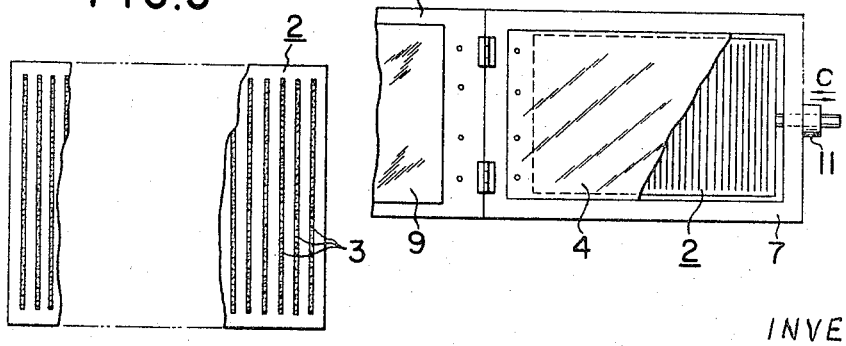

United States Patent Office 3,382,362
Patented May 7, 1968

3,382,362
FLUORESCENT SCREEN FOR AN X-RAY STEREO-SCOPIC PHOTOGRAPHIC DEVICE
Tomoyasu Tokuyama, 108 5-chome, Gotanda, Shinagawa-ku, Tokyo-to, Japan, and Masaaki Kobori and Michio Horiuchi, Tokyo-to Japan; said Kobori and said Horiuchi assignors to said Tokuyama
Filed May 7, 1965, Ser. No. 454,001
Claims priority, application Japan, May 13, 1964, 39/36,834
9 Claims. (Cl. 250—60)

ABSTRACT OF THE DISCLOSURE

A device for stereoscopic X-ray photography is disclosed as including a source of X-rays positioned on one side of a body or specimen to be examined and a screen and a film are positioned on the opposite side of the body or specimen to be examined so that X-rays passing through the body or specimen to be examined will impinge on the screen. The screen is formed of material which is impervious to X-rays, impervious to visible light rays, or impervious to both, and is formed with a series of uniformly spaced and parallel, relatively narrow slots therethrough extending transversely thereof. Either fluorescent material is disposed in each of these slots or an intensifying sheet of fluorescent material is disposed along the surface of the screen remote from the source of X-rays. The film may be placed on the side of the screen remote from the source of X-rays, as on the side of the intensifying sheet, or may be placed on that side of the screen facing the X-ray source. The film is insensitive to X-rays but is sensitive to visible light rays. The X-ray source is displaceable in a direction substantially parallel to the screen and perpendicular to the slot direction, and either the screen or the film is similarly displaceable, parallel to itself, in coordination with the displacement of the X-ray source, but in a direction opposite to the direction of displacement of the X-ray source. Thus, the X-ray source can be moved in a plane parallel to the screen or may be moved through a relatively long radius arc centered on the object or specimen at its contact with the screen. X-rays passing through the object and through the slots excite the fluorescent material to produce visible light rays which expose the film.

Background of the invention

This invention relates to X-ray photography. More specifically, the invention relates to a new X-ray stereoscopic photographic device for use in photographic apparatus wherein X-rays are projected toward an object to be photographed, the resulting radiated X-rays are directed onto a fluorescent material and transformed into visible light rays, and a film is exposed to these visible light rays.

It is an object of the present invention to provide an X-ray stereoscopic photographic device of the above stated character which is of simple construction and can be easily used.

Another object of the invention is to provide a device of the above stated character which is capable of accomplishing stereoscopic photography merely by moving an X-ray source and any one of an X-ray screen or a film without moving the object to be photographed.

A further object of the invention is to provide a device of the above stated character in which an ordinary photographic film can be used.

According to the present invention, briefly stated, there is provided an X-ray stereoscopic photographic device comprising, within a cassette structure, an X-ray screen formed with a plurality of uniformly spaced and parallel slots therethrough extending transversely thereof with fluorescent material at these slots and a film disposed in close contact with said screen, either said screen or said film being movable in a direction perpendicular to the longitudinal extent of the slots and substantially parallel to itself, and the fluorescent material operating to transform X-rays, which have passed through an object to be photographed, into visible light rays which are used to expose the film.

The nature, principle, and details of the invention will be more clearly apparent from the following detailed description when taken in conjunction with the accompanying drawing in which like parts are designated by like reference characters, and in which:

FIG. 2 is a schematic top vertical sectional view indicating the viewing by human eye of a film photographed according to the invention;

FIG. 3 is a perspective view, with parts cut away, showing one embodiment of the device according to the invention;

FIG. 4 is an elevational view, with a part cut away, showing essential parts of the device shown in FIG. 3 with its rear cover in opened state; and FIG. 5 is an elevational view, with a part cut away, showing one embodiment of the X-ray shield screen according to the invention.

Figure 1:
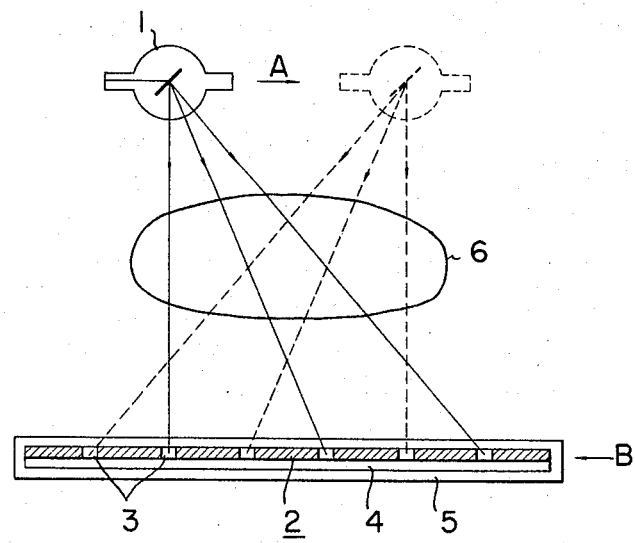
FIG. 1 is a schematic view in side elevation indicating a photographic method employing the device according to the invention.

Referring to FIG. 1 indicating the principle of the most basic form of X-ray stereoscopic photography, there are provided in the apparatus shown an X-ray tube 1 and an X-ray screen 2 formed with a plurality of uniformly spaced and parallel slots therethrough extending transversely thereof, the screen being made of a material capable of shielding out X-rays, impermeable to visible light rays, or both. Fluorescent material 3, for transforming projected X-rays into visible light rays, is imbedded in each of the parallel slots. A film 4 is positioned parallel to the screen 2 and on the side thereof remote from the X-ray tube 1, and screen 2, film 4 and other parts are enclosed within a cassette 5.

In photographing an object 6 placed between screen 2 and X-ray source 1, cassette 5 is maintained stationary and X-ray tube 1 is moved in a direction perpendicular to the longitudinal extent of the slots in screen 2, and substantially parallel to screen 2, as shown, for example, by arrow A in FIG. 1. Alternatively, X-ray tube 1 may be revolved about object 6 as the center during the exposure of film 4. Instead of moving X-ray tube 1, object 6 may be rotated or revolved with X-ray tube 1 as the center, while X-ray tube 1 remains stationary. Each of these movements has substantially the same effect on the position or orientation of the X-rays relative to object 6.

X-ray screen 2 and film 4 are disposed in close surface contact with each other within cassette 5, and screen 2 is arranged to be movable in the direction of the arrow B in FIG. 1. Alternatively, only film 4 may be adapted to be movable relative to screen 2.

When X-ray tube 1 is moved a distance in excess of the arcuate extent of the ocular parallax angle, which is the angle between the respective lines of sight extending from the two eyes to a point, screen 2 within cassette 5 is moved through a distance corresponding to one slot pitch in coupled relation with X-ray tube 1. The movement of screen 2 is parallel to itself but in a direction opposite to the movement of X-ray tube 1, and both directions are perpendicular to the longitudinal extent of the slots in the screen. By doing this, the X-rays from tube 1 are radiated through object 6 and impinge on the fluorescent material 3 of the screen 2 within cassettee 5, so that the wave lengths of the X-rays are transformed into those of visible light rays. These visible light rays effect exposure of the ordinary film 4 which is not sensitive to X-rays.

When the X-ray tube 1 moves leftwards or rightwards relative to the object 6, an image with ocular parallax is projected onto the screen 2 for each position of the tube 1. By moving this screen by one slot pitch in coupled relationship with the X-ray tube 1, a continuous image of different parallax is formed on the film surface at intervals of one slot pitch of the screen, and, by placing a lenticular lens 12 on the film surface after developing, as shown in FIG. 2, it is possible to view a three-dimensional image 13 from the indicated viewing direction.

In a preferred embodiment of the device according to the invention as shown in FIG. 3, there is provided a frame 7 having on its front face (the face receiving projected X-rays) a plate 8. Behind this plate 8 there are disposed an X-rays screen 2 having the aforementioned plurality of uniformly spaced, parallel slots therethrough extending transversely thereof, with the slots spaced at a specific pitch interval, at which slots a fluorescent material 3 is provided, a film 4 in close contact with the rear side of the screen 2, and a hinged rear cover 10 provided with a pressure plate 9, the hinged rear cover 10 being openable and closeable at will because of its hinged attachment.

An adjustment knob 11 provided outside of the frame 7 is coupled to the screen 2 and adapted to undergo suitably coupled movement with the X-ray tube 1, whereby the screen 2 can be moved within the frame 7 in the directions of the arrows C of FIG. 4. Said suitably coupled movement of the screen 2 and the X-rays tube 1 can be achieved, for example, by a mechanism comprising a rack provided on the movable supporter for moving the X-ray tube, a first pinion engaged with said rack, a second pinion attached to a shaft driven by said first pinion, and a rack engaged with said second pinion and coupled with the shaft of the knob 11.

While, in the example illustrated in FIGS. 3 and 4, the X-ray screen 2 is movable parallel to itself through a specific distance and the film is fixed, the same effect can be achieved by conversely fixing the screen and adapting the film to be movable parallel to itself.

Furthermore, while in the above described example, the X-rays screen 2 is disposed on the side of the film 4 toward the X-rays tube 1, it is also possible to dispose the screen 2 on the opposite (downstream) side of the film 4. The reason for this is that, since the film used has the property of not being sensitive to X-rays, the X-rays which have first passed through the film impinge on the fluorescent material 3 of the screen 2 disposed on the rear surface of the film, and the visible light rays thus produced in the fluorescent material cause exposure of the film.

FIG. 5 illustrates one practical example of the X-ray screen 2 according to the invention. In this screen, the width of the slots in which fluorescent material 3 is imbedded is substantially narrower than the width of the opaque grating part which shields out X-rays, the ratio of said widths being approximately 1:10.

For this X-rays screen, of course, a combination of a very thin sheet of grating form capable of shielding out visible light rays and an intensifying sheet of fluorescent material bonded thereto can also be used.

Thus, the device according to the invention is of very simple arrangement and construction and can be easily handled. Accordingly, this device is highly effective for use as a cassette in X-ray stereoscopic photography. That is, since this device according to the invention transforms X-rays radiated through a photographic object into visible light rays to cause exposure of a film, ordinary photographic film can be used for this film. Furthermore, stereoscopic photography can be accomplished in a simple manner without moving the object to be photographed merely by causing a slight movement of the X-ray tube and any one of the X-ray screen or the film.

It should be understood, of course, that the foregoing disclosure relates to only a preferred embodiment of the invention and that it is intended to cover all changes and modifications of the example of the invention herein chosen for the purposes of the disclosure, which do not constitute departures from the spirt and scope of the invention as set forth in the appended claims.

What we claim is:

1. A stereoscopic X-ray photographic device comprising, in combination, a source of X-rays; a screen spaced from said source for interposition therebetween of an object or the like to be photographed; and a photographic film, said screen and said film being in superposed relation with each other; said screen comprising a grating of opaque material formed with a plurality of uniformly spaced, relatively elongated parallel slots therethrough extending transversely thereof, and material, emitting visible light rays responsive to excitation by X-rays, positioned for excitation by X-rays passing through said slots and in operative relation with said film; said source and one of said screen and said film being conjointly relatively movable in opposed directions substantially perpendicular to the longitudinal extent of said slots and substantially parallel to said screen.

2. A stereoscopic X-rays photographic device, as claimed in claim 1, in which said material is fluorescent material disposed in said slots in said screen.

3. A stereoscopic X-rays photographic device, as claimed in claim 1, in which said material is a sheet of fluorescent material bonded to said screen.

4. A stereoscopic X-ray photographic device, as claimed in claim 1, in which the material of said screen is opaque to X-rays.

5. A stereoscopic X-ray photographic device, as claimed in claim 1, in which the material of said screen is opaque to visible light rays.

6. A stereoscopic X-ray photographic device, as claimed in claim 3, in which said film is superposed on said screen on the side thereof toward said source.

7. A stereoscopic X-ray photographic device, as claimed in claim 1, in which said film is placed adjacent the side of said screen remote from said source.

8. A stereoscopic X-ray photographic device, as claimed in claim 1, in which said source is movable in a plane substantially parallel to said screen.

9. A stereoscopic X-ray photographic device, as claimed in claim 1, in which said source is movable through a larger radius arc having its center in a surface of said screen.

References Cited

UNITED STATES PATENTS 2,512,242 6/1950 St. Genies _____ 250—61
2,794,925 6/1957 Denquet _____ 250—61

RALPH G. NILSON, *Primary Examiner.*

A. L. BIRCH, *Assistant Examiner.*